(12) United States Patent
Li et al.

(10) Patent No.: US 12,068,646 B2
(45) Date of Patent: Aug. 20, 2024

(54) PERMANENT MAGNET MOTOR TOPOLOGICAL CONSTRUCTION METHOD BASED ON WORKING MAGNETIC FIELD HARMONIC ORIENTATION AND MOTOR

(71) Applicant: HUAZHONG UNIVERSITY OF SCIENCE AND TECHNOLOGY, Hubei (CN)

(72) Inventors: Dawei Li, Hubei (CN); Li Fang, Hubei (CN); Xiang Ren, Hubei (CN); Ronghai Qu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 358 days.

(21) Appl. No.: 17/606,737

(22) PCT Filed: Jan. 21, 2021

(86) PCT No.: PCT/CN2021/072999
§ 371 (c)(1),
(2) Date: Oct. 26, 2021

(87) PCT Pub. No.: WO2022/095283
PCT Pub. Date: May 12, 2022

(65) Prior Publication Data
US 2022/0216777 A1 Jul. 7, 2022

(51) Int. Cl.
H02K 21/22 (2006.01)
H02K 1/2791 (2022.01)

(52) U.S. Cl.
CPC ............ H02K 21/22 (2013.01); H02K 1/2791 (2022.01); H02K 2213/03 (2013.01)

(58) Field of Classification Search
CPC .. H02K 21/22; H02K 1/2791; H02K 2213/03; H02K 29/03; H02K 2201/03;
(Continued)

(56) References Cited

U.S. PATENT DOCUMENTS 5,751,089 A * 5/1998 Stridsberg ............ H02K 21/125
310/266
7,723,888 B2 * 5/2010 Petek ..................... H02K 29/03
310/112

(Continued)

FOREIGN PATENT DOCUMENTS

CN 102255598 A 11/2011
CN 105680652 A 6/2016
(Continued)

OTHER PUBLICATIONS

CN 105958762 A Machine Translation (Year: 2016).*
International Search Report issued in PCT/CN2021/072999, Jul. 26, 2021 (4 pages).

Primary Examiner — Donghai D Nguyen
(74) Attorney, Agent, or Firm — HSML P. C.

(57) ABSTRACT

A method includes calculating an initial phase $\theta_{gv}$ of each air gap working magnetic field $B_{gv}$ required to generate positive back EMF based on certain parameters of each armature harmonic $v^{th}$; generating $B_{gv}$ and maximizing a sum of equivalent air gap flux density amplitude $B_{eqv}$ of each of the air gap working magnetic fields $B_{gv}$ while calculating a phase $\theta_{mv}$ and a pole arc coefficient $\alpha_v$ corresponding to each permeance harmonic; designing a number, a position(s) and a length(s) along a circumference of modulation teeth corresponding to each of the permeance harmonics based on the phase $\theta_{mv}$ and the pole arc coefficient $\alpha_v$, such that a generated permeance model is consistent with the phase $\theta_{mv}$ of each of the permeance harmonics; and optimizing radial dimensions of modulation teeth corresponding to each of the permeance harmonics to maximize the sum of equivalent air gap flux density amplitude $B_{eqv}$.

10 Claims, 3 Drawing Sheets

Calculate an initial phase $\theta_{gv}$ of each air gap working magnetic field $B_{gv}$ required to generate a positive back electromagnetic force based on a winding coefficient $k_{wv}$, an initial phase $\theta_v$ and a rotation direction $sgn$ of each armature harmonic $v^{th}$ in a design target, each of the air gap working magnetic fields $B_{gv}$ is generated by the permanent magnet array — S1

With generating each of the air gap working magnetic fields $B_{gv}$ as a design target, calculate a phase $\theta_{mv}$ corresponding to each of the permeance harmonics; and with maximizing a sum of equivalent air gap magnetic density amplitude $B_{eqv}$ of each of the air gap working magnetic fields $B_{gv}$ as a design target, calculate a pole arc coefficient $\alpha_v$ of each of the permeance harmonics, each of the permeance harmonic is generated by the modulation tooth array — S2

Design a number, a position(s) and a length(s) along a circumference of modulation teeth corresponding to each of the permeance harmonics based on the phase $\theta_{mv}$ and the pole arc coefficient $\alpha_v$ of each of the permeance harmonics, such that a generated permeance model is consistent with the phase $\theta_{mv}$ of each of the permeance harmonics as designed in S2 — S3

Optimize radial dimensions of modulation teeth corresponding to each of the permeance harmonics, so as to maximize the sum of equivalent air gap flux density amplitude $B_{eqv}$ of each of the air gap working magnetic fields $B_{gv}$ — S4

(58) Field of Classification Search
CPC ............... H02K 1/2786; H02K 21/024; Y10T 29/49009; Y10T 29/49073; Y10T 29/49075
See application file for complete search history.

(56) References Cited

U.S. PATENT DOCUMENTS 9,595,858 B2 * 3/2017 Lipo .................. H02K 21/12
10,594,179 B2   3/2020 Liu et al.

FOREIGN PATENT DOCUMENTS

| CN | 105958762 A | * | 9/2016 |
| CN | 105958762 A |   | 9/2016 |
| CN | 107579606 A |   | 1/2018 |

* cited by examiner

| Calculate an initial phase $\theta_{gv}$ of each air gap working magnetic field $B_{gv}$ required to generate a positive back electromagnetic force based on a winding coefficient $k_{wv}$, an initial phase $\theta_{sv}$ and a rotation direction $sgn$ of each armature harmonic $v^{th}$ in a design target, each of the air gap working magnetic fields $B_{gv}$ is generated by the permanent magnet array | S1 |

| With generating each of the air gap working magnetic fields $B_{gv}$ as a design target, calculate a phase $\theta_{mv}$ corresponding to each of the permeance harmonics; and with maximizing a sum of equivalent air gap magnetic density amplitude $B_{eqv}$ of each of the air gap working magnetic fields $B_{gv}$ as a design target, calculate a pole arc coefficient $a_v$ of each of the permeance harmonics, each of the permeance harmonic is generated by the modulation tooth array | S2 |

| Design a number, a position(s) and a length(s) along a circumference of modulation teeth corresponding to each of the permeance harmonics based on the phase $\theta_{mv}$ and the pole arc coefficient $a_v$ of each of the permeance harmonics, such that a generated permeance model is consistent with the phase $\theta_{mv}$ of each of the permeance harmonics as designed in S2 | S3 |

| Optimize radial dimensions of modulation teeth corresponding to each of the permeance harmonics, so as to maximize the sum of equivalent air gap flux density amplitude $B_{eqv}$ of each of the air gap working magnetic fields $B_{gv}$ | S4 |

Fig. 1

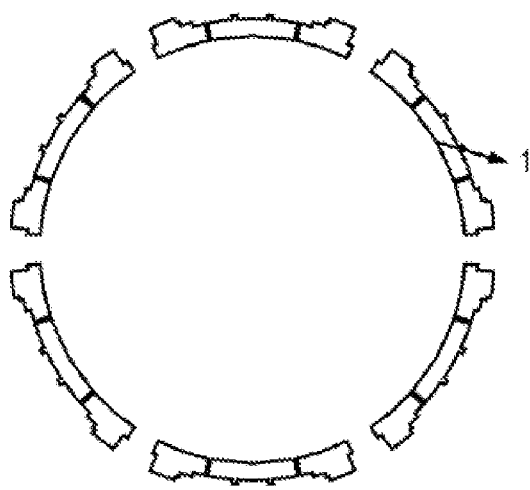

Fig. 2

PERMANENT MAGNET MOTOR TOPOLOGICAL CONSTRUCTION METHOD BASED ON WORKING MAGNETIC FIELD HARMONIC ORIENTATION AND MOTOR

TECHNICAL FIELD

The present invention belongs to the technical field of permanent magnet motors, and more specifically, relates to a permanent magnet motor topological construction method based on working magnetic field harmonic orientation and a motor.

BACKGROUND ART

Since the advent of the first electric motor in the 19th century, electric motors have become an indispensable industrial category of machines that supports the modern society of mankind. From large turbine generators with a single unit capacity of several thousand megawatts to micro motors as low as a few microwatts, motors are widely used in all aspects of the national economy. With the rising tide of alternate electrification and the continuous development in industrial robots, chip manufacturing, CNC machine tools and other manufacturing areas, motors play a critical role; meanwhile this has higher requirements in certain performance qualities, such as torque density, response speed, torque ripple, and the like. In this regard, high torque density has always been a main goal of motor development. It is of great significance for reducing the volume and cost of the drive system, and improving the response speed.

Traditional motors generally rely on a single working magnetic field to generate torques. Thus, an increase in torque density is limited by material properties. The structure of the vernier permanent magnet motor is similar to that of a traditional motor. However, since it is designed based on the principle of magnetic field modulation, in which two working magnetic fields are used for electromechanical energy conversion to generate torque, a high torque density can be achieved. At present, when designing motors, the designs of permanent magnet rotors, stators, armature windings and other structures in the motors are all limited within the framework of traditional topological structures. As a result, the improvement of performance needs to be achieved through repeated optimization of certain structural parameters. The design process is irregular and has high contingency in the design. Hence, it is difficult to realize the topology innovation of the motor and the improvement of the torque density.

SUMMARY OF THE INVENTION

In view of the defects and the improvement needs in the existing technology, the present invention provides a permanent magnet motor topological construction method based on the working magnetic field harmonic orientation and a motor. One object of the present invention is to combine the harmonic characteristics of the windings with initial phase, pole arc coefficient of the target working magnetic field and other parameters to quantitatively design the geometric dimensions of the motor modulation tooth array, so as to achieve that the phase of each permeance harmonic is consistent with the given value. In addition, the effective working magnetic field can be maximized by means of further structural optimization. In this way, the present invention solves the problems in the existing technology, including irregular qualitative design of permanent magnet motors and that it is difficult to achieve motor topological innovation and torque density improvement.

In order to achieve the above object, according to one aspect of the present invention, a permanent magnet motor topological construction method based on a harmonic orientation of a working magnetic field is provided, the permanent magnet motor comprises a stator wound with a winding, a permanent magnet array, a rotor, and a modulation tooth array, the method comprises: S1, calculating an initial phase $\theta_{gv}$ of each air gap working magnetic field $B_{gv}$ required to generate positive back electromotive force (EMF) based on a winding coefficient $k_{wv}$, an initial phase $\theta_{sv}$ and a rotation direction sgn of each armature harmonic $v^{th}$ in a design target, wherein each of the air gap working magnetic fields $B_{gv}$ is generated by the permanent magnet array; S2, with generating each of the air gap working magnetic fields $B_{gv}$ as a design target, calculating a phase $\theta_{mv}$ corresponding to each permeance harmonic; and with maximizing a sum of equivalent air gap magnetic density amplitude $B_{eqv}$ of each of the air gap working magnetic fields $B_{gv}$ as a design target, calculating a pole arc coefficient $\alpha_v$ of each of the permeance harmonics, wherein each of the permeance harmonics is generated by the modulation tooth array; S3, designing a number, a position(s) and a length(s) along a circumference of modulation teeth corresponding to each of the permeance harmonics based on the phase $\theta_{mv}$ and the pole arc coefficient $\alpha_v$ of each of the permeance harmonics, such that a generated permeance model is consistent with the phase $\theta_{mv}$ of each permeance harmonic as designed in S2; and S4, optimizing radial dimensions of modulation teeth corresponding to each of the permeance harmonics, so as to maximize the sum of equivalent air gap magnetic density amplitude $B_{eqv}$ of each of the air gap working magnetic fields $B_{gv}$.

Further, S3 comprises: designing the length(s) along a circumference of the modulation teeth corresponding to each of the permeance harmonics based on the phase $\theta_{mv}$ and the pole arc coefficient $\alpha_v$ of each of the permeance harmonics; and superimposing the modulation teeth corresponding to each of the permeance harmonics to maximize an overlap area of all modulation teeth, so as to determine the number and position(s) of the modulation teeth corresponding to each of the permeance harmonics.

Further, S4 comprises: optimizing radial dimensions of modulation teeth in a non-overlap area, so as to maximize the sum of equivalent air gap magnetic density amplitude $B_{eqv}$ of each of the air gap working magnetic fields $B_{gv}$.

Further, in S1, the initial phase $\theta_{gv}$ is calculated based on same phase $\varphi_v$ of the back EMF generated by each of the air gap working magnetic fields $B_{gv}$, the phase $\varphi_v$ of back EMF is:

$$\varphi_v = \begin{cases} \theta_{gv} - \theta_{sv} & \text{sgn}(v) = 1 \\ -(\theta_{gv} - \theta_{sv}) + \pi & \text{sgn}(v) = -1 \end{cases}$$

wherein, sgn(v) is a rotation direction of the air gap working magnetic field $B_{gv}$.

Further, the method further comprises: S5, optimizing the stator, such that a teeth portion of the stator is composed of two alternate sets of stator teeth portions of different widths, and the winding is wound on an outer side of the stator teeth portion that is wider.

Further, the winding coefficient $k_{wv}$ is as follows:

$$k_{wv} = k_{yv} \cdot k_{dv} \cdot k_{sv}$$

wherein $k_{yv}$ is a pitch coefficient, $k_{dv}$ is a distribution coefficient, $k_{sv}$ is a notch coefficient; the rotation direction sgn is determined by a winding phase number and an armature harmonic order v.

Further, the number of the air gap working magnetic field $B_{gv}$ is one or more, forming a corresponding single-harmonic working magnetic field or multi-harmonic working magnetic field.

According to another aspect of the present invention, a permanent magnet motor is provided, which comprises a rotor, a stator and a rotating shaft that are sleeved coaxially, characterized in that a side of the stator opposite to the rotor is provided with a modulation tooth array, or a side of the rotor opposite to the stator is provided with a modulation tooth array, and the modulation tooth array is formed by the permanent magnet motor topological construction method based on a harmonic orientation of a working magnetic field as described above.

Further, the permanent magnet motor further compromises a permanent magnet array, the permanent magnet array and the modulation tooth array are arranged opposite to each other, an air gap is formed between the permanent magnet array and the modulation tooth array, the permanent magnet array is magnetized radially, and the magnetizing directions of adjacent permanent magnets are opposite to each other.

Further, the permanent magnet array is a stator structure or a rotor structure, and each magnet in the array is of equal or unequal width.

In general, through the above technical solutions proposed in the present invention, the following beneficial effects can be achieved:

(1) The air gap working magnetic field required for the positive back electromagnetic force (EMF) of the motor can be generated based on the analysis of the harmonic characteristics of the windings; in addition, the harmonic components for the air gap permeance function can be obtained through reverse deduction, so as to quantitatively design the dimensions of the modulation teeth corresponding to each permeance harmonic, and achieve that the amplitude and phase of each permeance harmonic are consistent with the given analysis values. In addition, by means of further structural optimization, the effective working magnetic field can be maximized, so as to take full advantage of the electromechanical energy conversion ability of the permanent magnet and the winding, and improve the torque output capacity of the motor.

(2) The winding of the stator is optimized. The widths of the main teeth are alternately arranged, in which winding coils are wound on those wide main teeth, while the narrow main teeth can provide more slot space for the winding coils, so as to improve the slot full rate of the winding coils.

(3) The motor constructed by the method of the present invention has uneven modulation teeth. When the modulating teeth interact with the permanent magnet array, a targeted working magnetic field of directional design can be generated. The target working magnetic field can be a single working magnetic field or a multi-harmonic working magnetic field, which thus has a wide range of applications. In addition, the multi-harmonic working magnetic field can make the motor obtain stronger torque generation ability, and further improve the torque density of the motor.

BRIEF DESCRIPTION OF THE DRAWINGS

FIG. 1 is a flowchart of a permanent magnet motor topological construction method based on a harmonic orientation of a working magnetic field according to some embodiments of the present invention;

FIG. 2 is a schematic diagram of an initial structure of the modulation tooth array;

In all the drawings, the same reference numerals are used to denote the same elements or structures, in which:

Figure 3:
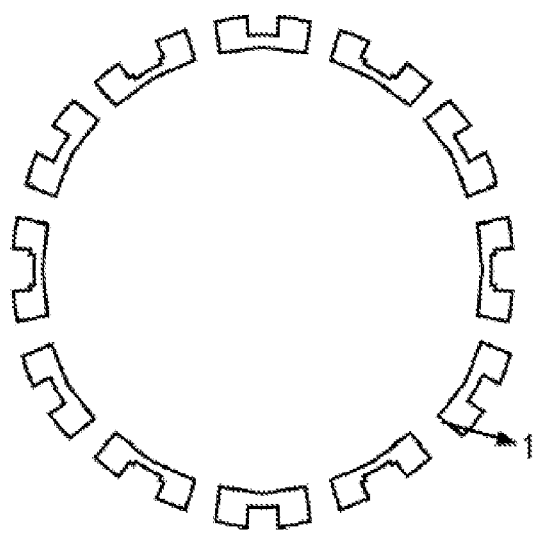
FIG. 3 is a schematic diagram of an optimized structure of a modulation tooth array with an oriented-designed structure according to some embodiments of the present invention.

1 is a modulation tooth array, 2 is a winding, 3 is a stator, 4 is a rotor, 5 is a permanent magnet array, and 6 is a rotating shaft.

DETAILED DESCRIPTION

In order to make the objects, technical solutions, and advantages of the present invention clear, the following further describes the present invention in detail with reference to the accompanying drawings and some embodiments. It should be understood that the specific embodiments described here are only used to explain the present invention, but do not limit the present invention. In addition, the technical features involved in various embodiments of the present invention described below can be combined with each other as long as they do not conflict with each other.

In the present invention, the terms "first", "second", etc. (if any) in the description and the accompanying drawings are used to distinguish similar objects, and are not necessarily used to describe a specific sequence or order.

FIG. 1 is a flowchart of a permanent magnet motor topological construction method based on a harmonic orientation of a working magnetic field according to some embodiments of the present invention. Referring to FIG. 1, in conjunction with FIG. 2 to FIG. 6, the permanent magnet motor topological construction method based on a harmonic orientation of a working magnetic field in one or more embodiments will be described in detail. The method includes the operation S1 to operation S4.

Operation S1, calculate an initial phase $\theta_{gv}$ of each air gap working magnetic field $B_{gv}$ required to generate a positive back EMF based on a winding coefficient $k_{wv}$, an initial phase $\theta_{sv}$ and a rotation direction sgn of each armature harmonic $v^{th}$ in a design target, wherein each air gap working magnetic field $B_{gv}$ is generated by the permanent magnet array.

The permanent magnet motor includes a stator 3 wound with a winding 2, a permanent magnet array 5, a rotor 4, a modulation tooth array 1 and a rotating shaft 6. Specifically, for example, the rotor, the stator, and the rotating shaft are sleeved coaxially in sequence from the outside to the inside, or the stator and the rotor shafts are sleeved coaxially in sequence from the outside to the inside. An air gap is formed between the rotor and the stator. A permanent magnet array is embedded on the rotor near the air gap surface. A modulation tooth array is arranged on the stator near the air gap surface; alternatively, the stator has a permanent magnet array embedded near the air gap surface, and the rotor near the air gap surface is provided with a modulation tooth array. The stator teeth are wound with coils. The specific coils are further connected in series or in parallel to form a phase winding. In this embodiment, as shown in FIG. 2 to 6, the rotor, the stator, and the rotating shaft are coaxially sleeved from outside to inside, the rotor near the air gap surface is embedded with a permanent magnet array, and the stator near the air gap surface is provided with a modulation tooth array. The above is taken as an example to illustrate the specific operation process of the permanent magnet motor topological construction method based on a harmonic orientation of a working magnetic field.

Prior to performing the operation of S1, a central axis of a phase winding is regarded as an initial position, according to the structural characteristics of the winding, the information including winding coefficient $k_{wv}$, the initial phase $\theta_{sv}$, and the rotation direction sgn of each armature harmonic $v^{th}$ can be determined. In this embodiment, that the number of pole pairs is 1 is defined as a fundamental harmonic, accordingly the armature harmonic $v^{th}$ corresponds to v pole pairs. The winding coefficient $k_{wv}$ is:

$$k_{wv} = k_{yv} \cdot k_{dv} \cdot k_{sv}$$

in which $k_{yv}$ is a pitch coefficient, $k_{dv}$ is a distribution coefficient, $k_{sv}$ is a slotting coefficient; the rotation direction sgn is determined by a winding phase number m and a armature harmonic order v. In this embodiment, counterclockwise is designated as the forward (positive) rotation direction, where sgn=+1; and clockwise is designated as the reverse (negative) rotation direction, where sgn=−1.

In this embodiment, the number of pole pairs of the permanent magnets of the rotor is set as a single harmonic $P_{r1}$=20. The winding adopts a single-layer concentrated winding. The central axis of the phase A winding is taken as the initial position 0, the span mechanical angle $\theta_0$ of a single coil is set as 15°. The above setting is taken as an example, the winding coefficient $k_{wv}$, the initial phase $\theta_{sv}$ and the rotation direction sgn of the armature harmonics of the single-layer concentrated are shown in Table 1 below.

TABLE 1

| Harmonic pole pair number v | $k_{wv}$ | $\theta_{sv}$ | sgn |
|---|---|---|---|
| 2 | 0.5 | 0° | +1 |
| 4 | 0.867 | 0° | −1 |
| 8 | 0.867 | 0° | +1 |
| 10 | 0.5 | 0° | −1 |
| 14 | 0.5 | 180° | +1 |
| 16 | 0.867 | 180° | −1 |
| 20 | 0.867 | 180° | +1 |
| 22 | 0.5 | 180° | −1 |

Further, based on the obtained winding coefficient $k_{wv}$, initial phase $\theta_{sv}$, and rotation direction sgn, the initial phase $\theta_{gv}$ of each air gap working magnetic field $B_{gv}$ required to generate the positive back EMF can be obtained through reverse deduction. In this embodiment, the no-load counter electromagnetic force $E_1$ of the motor is as follows:

$$E_1 = D_g L N_s \omega_m \sum_{v=2,4\ldots} \mathrm{sgn} B_{eqv} \sin(\mathrm{sgn}(v) P_r \omega_m t + \theta_{gv} - \theta_{sv})$$

in which $D_g$ is the diameter corresponding to the air gap of the motor; L is the effective shaft length of the motor; $N_s$ is the number of turns of the phase winding in series; $\omega_m$ is the mechanical rotational angular velocity of the rotor; sgn(v) is the rotation direction of the air gap working magnetic field $B_{gv}$; $P_r$ is the number of pole pairs of the permanent magnet array; t is time; v is the order of the air gap working flux density; $B_{eqv}$ is an equivalent flux density amplitude obtained in a process of simplifying the expression of the no-load back EMF, including the amplitude of the $v^{th}$ air gap flux density, the $v^{th}$ winding coefficient, and a constant $P_r/v$.

In order to make all working magnetic fields contribute positive back EMF, the above formula of the no-load back EMF $E_1$ reflects that the back EMF contributed by each air gap working magnetic field $B_{gv}$ has the same phase $\varphi_v$. In this regard, in the embodiment of the present invention, in operation S1, the initial phase $\theta_{gv}$ can be calculated according to the same phase $\varphi_v$ of the back EMF generated by each air gap working magnetic field $B_{gv}$, and the phase $\varphi_v$ of the counter electromagnetic force is as follows:

$$\varphi_v = \begin{cases} \theta_{gv} - \theta_{sv} & \mathrm{sgn}(v) = 1 \\ -(\theta_{gv} - \theta_{sv}) + \pi & \mathrm{sgn}(v) = -1 \end{cases}$$

in which, sgn(v) is the rotation direction of the air gap working magnetic field $B_{gv}$. For the example shown in Table 1, the initial phase $\theta_{gv}$ can be calculated according to $\varphi_2 = \varphi_4 = \varphi_8 = \varphi_{10} = \varphi_{14} = \varphi_{16} = \varphi_{20} = \varphi_{22}$, and the initial phase $\theta_{gv}$ of each air gap working magnetic field $B_{gv}$ obtained is as shown in Table 2 below.

TABLE 2

| Harmonic pole pair number v | $\theta_{gv}$ | Harmonic pole pair number v | $\theta_{gv}$ |
|---|---|---|---|
| 2 | 90° | 14 | −90° |
| 4 | −90° | 16 | −90° |
| 8 | 90° | 20 | 90° |
| 10 | −90° | 22 | −90° |

Operation S2, with generating each air gap working magnetic field $B_{gv}$ as a design target, calculate a phase $\theta_{mv}$ of each corresponding permeance harmonic; and with maximizing a sum of equivalent air gap flux density amplitude $B_{eqv}$ of each air gap working magnetic field $B_{gv}$ as a design target, calculate a pole arc coefficient $\alpha_v$ of each permeance harmonic, and each permeance harmonic is generated by the modulation tooth array.

The air gap working magnetic field of a vernier permanent magnet motor can be obtained by the product of the magnetmotive force (MMF) function and the permeance function. In this embodiment, the air gap working magnetic field B is as follows:

$$B = F_1 \cos(P_r(\theta - \omega_m t) + \theta_{r1}) \left[ \Lambda_{s0} + \sum_j \Lambda_{sj} \cos(j\theta + \theta_{mj}) \right]$$

After further expansion, the air gap working magnetic field B is as follows:

$$B = F_1 \Lambda_{s0} \cos(P_r(\theta - \omega_m t) + \theta_{r1}) +$$

$$\left[ \sum_j \frac{F_1 \Lambda_{sj}}{2} \cos((P_r \pm j)\theta - P_r \omega_m t + (\theta_{r1} - \theta_{mj})) \right]$$

$$\theta_{gv} = \mathrm{sgn1}(v)(\theta_{r1} - \theta_{mj})$$

$$\mathrm{sgn1}(v) = \begin{cases} +1, v = P_r \pm j \\ -1, v = -P_r + j \end{cases}$$

in which, $F_1$ is the fundamental excitation MMF of the permanent magnet, $\Lambda_{s0}$ is the constant component of an air gap permeance function, $\theta$ is the spatial mechanical angular position, $\theta_{r1}$ is the initial electrical angle of the fundamental excitation MMF of the permanent magnet, $\Lambda_{sj}$ is the $j^{th}$ harmonic component of the air gap permeance function, $\theta_{mj}$ is the initial electrical angle of $\Lambda_{sj}$. On the basis of the initial phase $\theta_{gv}$ of each air gap working magnetic field $B_{gv}$ obtained in operation S1, the corresponding phase $\theta_{mv}$ of each permeance harmonic can be derived therefrom. In addition, certain simulation software can be used to simulate and optimize the pole arc coefficient $\alpha_v$ of each permeance harmonic. The optimization goal is to maximize the sum of the equivalent air gap flux density amplitude $B_{eqv}$ of each air gap working magnetic field $B_{gv}$, so as to obtain the optimal pole arc coefficient $\alpha_v$. Still taking the permanent magnet motor in Table 1 and Table 2 as an example, the phase $\theta_{mv}$ and pole arc coefficient $\alpha_v$ obtained are shown in Table 3 below.

TABLE 3

| Permeance harmonic pole pair number | $\theta_{mv}$ | $\alpha v$ |
|---|---|---|
| 6 (1$^{st}$) | 0° | 0.8 |
| 12 (2$^{nd}$) | 180° | 0.8 |
| 18 (3$^{rd}$) | 180° | 1 |
| 24 (4$^{th}$) | 180° | 1 |
| 30 (5$^{th}$) | 180° | Determined by 1$^{st}$ permeance harmonic |
| 36 (6$^{th}$) | 0° | Determined by 1$^{st}$, 2$^{nd}$, 3$^{rd}$ permeance harmonics |
| 42 (7$^{th}$) | 0° | Determined by 1$^{st}$ permeance harmonic |

Operation S3, design a number, a position(s) and a length(s) along a circumference of modulation teeth corresponding to each permeance harmonic based on the phase $\theta_{mv}$ and the pole arc coefficient $\alpha_v$ of each permeance harmonic, such that a generated permeance model is consistent with the phase $\theta_{mv}$ of each permeance harmonic as designed in S2.

In operation S3, a specific modulation tooth array structure is constructed according to the phase $\theta_{mv}$ and pole arc coefficient $\alpha_v$ of each permeance harmonic. This structure is the initial structure of the modulation tooth array. Taking the information obtained in Table 3 as an example, the initial structure of the constructed modulation tooth array is shown in FIG. 2.

According to some embodiments of the present invention, operation S3 includes sub-operation S31 and sub-operation S32.

In sub-operation S31, the length(s) along a circumference of the modulation teeth corresponding to each permeance harmonic is designed based on the phase $\theta_{mv}$ and the pole arc coefficient $\alpha_v$ of each permeance harmonic.

In sub-operation S32, the modulation teeth corresponding to each permeance harmonic to maximize an overlap area of all modulation teeth are superimposed, so as to determine the number and position(s) of the modulation teeth corresponding to each permeance harmonic.

Operation S4, optimize radial dimensions of modulation teeth corresponding to each permeance harmonic, so as to maximize the sum of equivalent air gap flux density amplitude $B_{eqv}$ of each air gap working magnetic field $B_{gv}$.

The initial structure of the modulation tooth array can be further optimized in detail to maximize the amplitude of the working magnetic field. The optimization target is to modulate the radial length of the tooth array. In combination with the simulation software, the optimization target is to maximize the sum of the equivalent air gap flux density amplitude $B_{eqv}$ of each air gap working magnetic field $B_{gv}$. The structure of the modulation tooth array obtained after the optimization is shown in FIG. 3.

According to some embodiments of the present invention, operation S4 includes optimizing radial dimensions of modulation teeth in a non-overlap area in operation S32, so as to maximize the sum of equivalent air gap flux density amplitude $B_{eqv}$ of each air gap working magnetic field $B_{gv}$.

According to some embodiments of the present invention, the permanent magnet motor topological construction method based on a harmonic orientation of a working magnetic field further includes: S5, optimizing the stator, such that a teeth portion of the stator is composed of two alternate sets of stator teeth portions of different widths, and the winding is wound on an outer side of the stator teeth portion that is wider. The narrow main teeth can provide more slot space for the winding coils, so as to improve the slot full rate of the winding coils.

Figure 4:
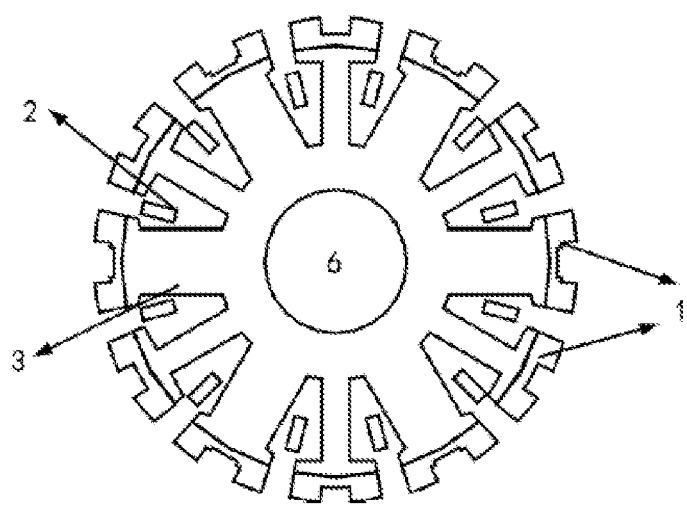
FIG. 4 is a schematic diagram of an overall structure of a stator in a permanent magnet motor with an oriented-designed structure according to some embodiments of the present invention.
Figure 5:
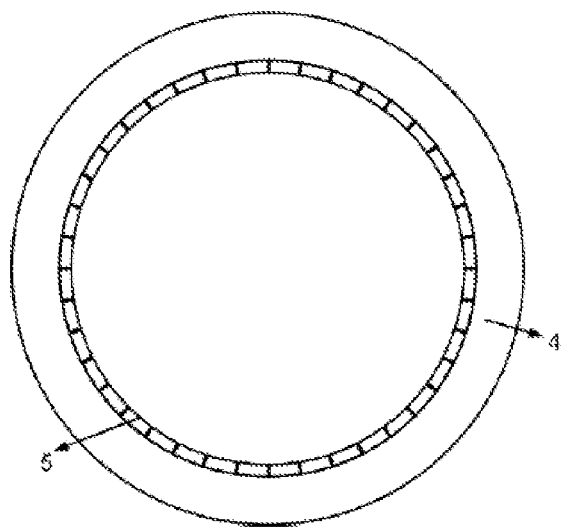
FIG. 5 is a schematic diagram of an overall structure of a rotor in a permanent magnet motor with an oriented-designed structure according to some embodiments of the present invention.
Figure 6:
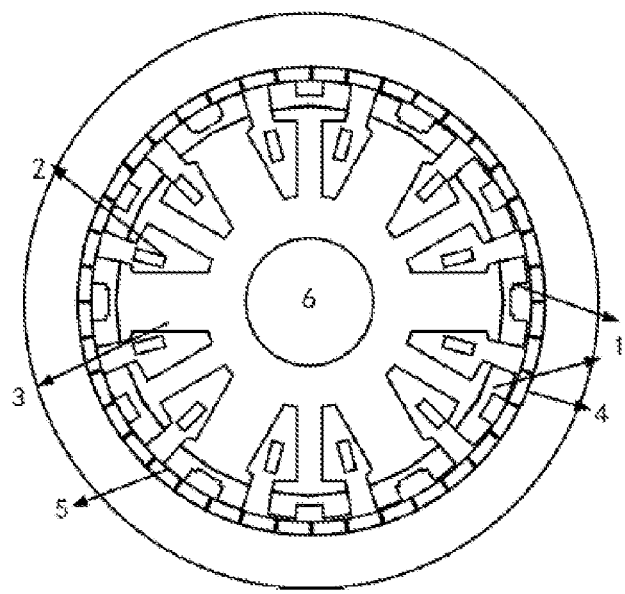
FIG. 6 is a schematic diagram of an overall structure a permanent magnet motor with an oriented-designed structure according to some embodiments of the present invention.

The optimized modulation tooth array is integrated with the stator to form the final stator structure. The stator teeth are wound with windings, and the optimized structure formed is shown in FIG. 4. The winding structure is consistent with the design target in which $\theta_0 = 15°$. This also verifies the effectiveness of the construction method. Further, the structure of the rotor and the permanent magnet array inside the rotor is shown in FIG. 5. The structure of the final nested permanent magnet motor is shown in FIG. 6 as an example. The widths of the magnets in the permanent magnet array can be equal or unequal. The magnets of equal width form a single excitation harmonic, and the magnets of unequal widths form multiple excitation harmonics. The dimensions of the modulation teeth in the modulation tooth array can be the same, the modulation teeth are evenly distributed along the circumference, so as to form a single permeance harmonic. The number of air gap working magnetic field $B_{gv}$ in this case is one. The dimensions of the modulation teeth may not be completely the same, so as to form a multi permeance harmonics. The number of the air gap working magnetic field $B_{gv}$ in this case is multiple.

Some embodiments of the present invention further provide a permanent magnet motor, which includes a rotor 4, a stator 3 and a rotating shaft 6 which are coaxially sleeved. The side of the stator 3 opposite to the rotor 4 is provided with a modulation tooth array 1, or the side of the rotor 4 opposite to the stator 3 is provided with a modulation tooth array 1. The modulation tooth array 1 is as shown in FIG. 1 to 6, and is formed through the permanent magnet motor topological construction method based on a harmonic orientation of a working magnetic field.

The permanent magnet motor further includes a permanent magnet array 5. The permanent magnet array 5 and the modulation tooth array 1 are arranged opposite to each other, and an air gap is formed therebetween. The permanent magnet array 5 is magnetized radially and the magnetizing directions of adjacent permanent magnets are opposite to each other. The permanent magnet array 5 is a stator structure or a rotor structure. Each magnet in the array is of equal or unequal width. The permanent magnet motor also includes a winding 2. The winding 2 is wound around the stator teeth. The stator is composed of two alternate sets of stator teeth with different widths. The winding 2 is wound around the wider stator teeth.

The permanent magnet motor in this embodiment is the same as the permanent magnet motor as shown in FIG. 1 to 6, which is formed through the permanent magnet motor topological construction method based on a harmonic orientation of a working magnetic field. Thus, it will not be repeated herein.

A person skilled in the art can easily understand that the above descriptions are only preferred embodiments of the present invention and are not intended to limit the present invention. Any modification, equivalent replacement and improvement made within the spirit and principle of the present invention shall fall within the scope of protection of the present invention.

The invention claimed is:

1. A permanent magnet motor topological construction method based on a harmonic orientation of a working magnetic field, the permanent magnet motor comprising a stator wound with a winding, a permanent magnet array, a rotor, and a modulation tooth array, the method comprises:
   S1, calculating an initial phase $\theta_{gv}$ of each air gap working magnetic field $B_{gv}$ required to generate a positive back electromotive force (EMF) based on a winding coefficient $k_{wv}$, an initial phase $\theta_{sv}$ and a rotation direction sgn of each armature harmonic $v^{th}$ in a design target, wherein each of the air gap working magnetic fields $B_{gv}$ is generated by the permanent magnet array;
   S2, with generating each of the air gap working magnetic fields $B_{gv}$ as a design target, calculating a phase $\theta_{mv}$ corresponding to each permeance harmonic; and with maximizing a sum of equivalent air gap magnetic density amplitude $B_{eqv}$ of each of the air gap working magnetic fields $B_{gv}$ as a design target, calculating a pole arc coefficient $\alpha_v$ of each of the permeance harmonics, wherein each of the permeance harmonics is generated by the modulation tooth array;
   S3, designing a number, a position, and a length along a circumference of modulation teeth corresponding to each of the permeance harmonics based on the phase $\theta_{mv}$ and the pole arc coefficient $\alpha_v$ of each of the permeance harmonics, such that a generated permeance model is consistent with the phase $\theta_{mv}$ of each of the permeance harmonics as designed in S2; and
   S4, optimizing radial dimensions of modulation teeth corresponding to each of the permeance harmonics, so as to maximize the sum of equivalent air gap magnetic density amplitude $B_{eqv}$ of each of the air gap working magnetic fields $B_{gv}$.

2. The permanent magnet motor topological construction method based on a harmonic orientation of a working magnetic field according to claim 1, wherein the S3 further comprises:
   designing the length along a circumference of the modulation teeth corresponding to each of the permeance harmonics based on the phase $\theta_{mv}$ and the pole arc coefficient $\alpha_v$ of each of the permeance harmonics; and
   superimposing the modulation teeth corresponding to each of the permeance harmonics to maximize an overlap area of all modulation teeth, so as to determine the number and position of the modulation teeth corresponding to each of the permeance harmonics.

3. The permanent magnet motor topological construction method based on a harmonic orientation of a working magnetic field according to claim 2, wherein the S4 further comprises:
   optimizing radial dimensions of modulation teeth in a non-overlap area, so as to maximize the sum of equivalent air gap flux density amplitude $B_{eqv}$ of each of the air gap working magnetic fields $B_{gv}$.

4. The permanent magnet motor topological construction method based on a harmonic orientation of a working magnetic field according to claim 1, wherein the S1 includes that the initial phase $\theta_{gv}$ is calculated based on same phase $\varphi_v$ of the back EMF generated by each of the air gap working magnetic fields $B_{gv}$, the phase $\varphi_v$ of the back EMF is:

$$\varphi_v = \begin{cases} \theta_{gv} - \theta_{sv} & \operatorname{sgn}(v) = 1 \\ -(\theta_{gv} - \theta_{sv}) + \pi & \operatorname{sgn}(v) = -1 \end{cases}$$

wherein, sgn(v) is a rotation direction of the air gap working magnetic field $B_{gv}$.

5. The permanent magnet motor topological construction method based on a harmonic orientation of a working magnetic field according to claim 1, the method further comprises:
   S5, optimizing the stator, such that a teeth portion of the stator is composed of two alternate sets of stator teeth portions of different widths, and the winding is wound on an outer side of the stator teeth portion that is wider.

6. The permanent magnet motor topological construction method based on a harmonic orientation of a working magnetic field according to claim 1, wherein the winding coefficient $k_{wv}$ is as follows:

$$k_{wv} = k_{yv} \cdot k_{dv} \cdot k_{sv}$$

wherein $k_{yv}$ is a pitch coefficient, $k_{dv}$ is a distribution coefficient, $k_{sv}$ is a slotting coefficient; the rotation direction sgn is determined by a winding phase number and an armature harmonic order v.

7. The permanent magnet motor topological construction method based on a harmonic orientation of a working magnetic field according to claim 1, wherein the number of the air gap working magnetic field $B_{gv}$ is one or more, forming a corresponding single-harmonic working magnetic field or multi-harmonic working magnetic field.

8. A permanent magnet motor, comprising a rotor, a stator and a rotating shaft that are sleeved coaxially, wherein a side of the stator opposite to the rotor is provided with a modulation tooth array, or a side of the rotor opposite to the stator is provided with a modulation tooth array, and the modulation tooth array is formed by the permanent magnet motor topological construction method based on a harmonic orientation of a working magnetic field according to claim 1.

9. The permanent magnet motor according to claim 8, wherein the permanent magnet array and the modulation tooth array are arranged opposite to each other, an air gap is formed between the permanent magnet array and the modulation tooth array, the permanent magnet array is magnetized radially, and the magnetizing directions of adjacent permanent magnets are opposite to each other.

10. The permanent magnet motor according to claim 9, wherein the permanent magnet array is a stator structure or a rotor structure, and each magnet in the array is of equal or unequal width.

\* \* \* \* \*